US006143407A

United States Patent [19]

Lythgoe et al.

[11] Patent Number: 6,143,407

[45] Date of Patent: Nov. 7, 2000

[54] STRONG, FLEXIBLE DRY TRANSFERS

[75] Inventors: Alan Lennox Lythgoe, Kent, United Kingdom; Dick J. van Heijningen, Alphen aan de Rijn, Netherlands

[73] Assignee: Trip Industries Holding B.V., AH-Lisse, Netherlands

[21] Appl. No.: 09/136,528

[22] Filed: Aug. 19, 1998

[30] Foreign Application Priority Data

Aug. 20, 1997 [GB] United Kingdom .................... 9717681

[51] Int. Cl.[7] ................................ B32B 3/00; B32B 7/12

[52] U.S. Cl. .......................... 428/354; 428/914; 428/195; 428/343

[58] Field of Search ..................................... 428/914, 915, 428/343, 354, 195, 483

[56] References Cited

U.S. PATENT DOCUMENTS

| | | | |
|---|---|---|---|
| 3,760,724 | 9/1973 | Budzinski et al. | 101/426 |
| 4,037,008 | 7/1977 | Tugwell | 428/200 |
| 4,820,559 | 4/1989 | Steelman . | |
| 5,571,557 | 11/1996 | De Bastiani et al. . | |
| 5,681,644 | 10/1997 | Dressler | 428/195 |

*Primary Examiner*—Daniel Zirker
*Attorney, Agent, or Firm*—McDermott, Will & Emery

[57] ABSTRACT

A decalcamania or pressure-sensitive dry transfer is described in which a transferable design or indicium is supported on a heat-resistant flexible carrier sheet. The design is formed, at least in part, from a heat-fused plastisol ink and has a pressure-sensitive adhesive coating covering the design and extending onto the carrier sheet. An intrinsically low tack adhesive is employed which is susceptible to plasticiser migration from the plastisol, so that the adhesive tack level is increased only in the part of the adhesive which is in contact with the plastisol. In an alternative embodiment, the adhesive coating is applied first to the carrier sheet and the design printed onto the adhesive coating, the design being releasable by manipulation of the carrier sheet.

12 Claims, 1 Drawing Sheet

STRONG, FLEXIBLE DRY TRANSFERS

Figure 1:
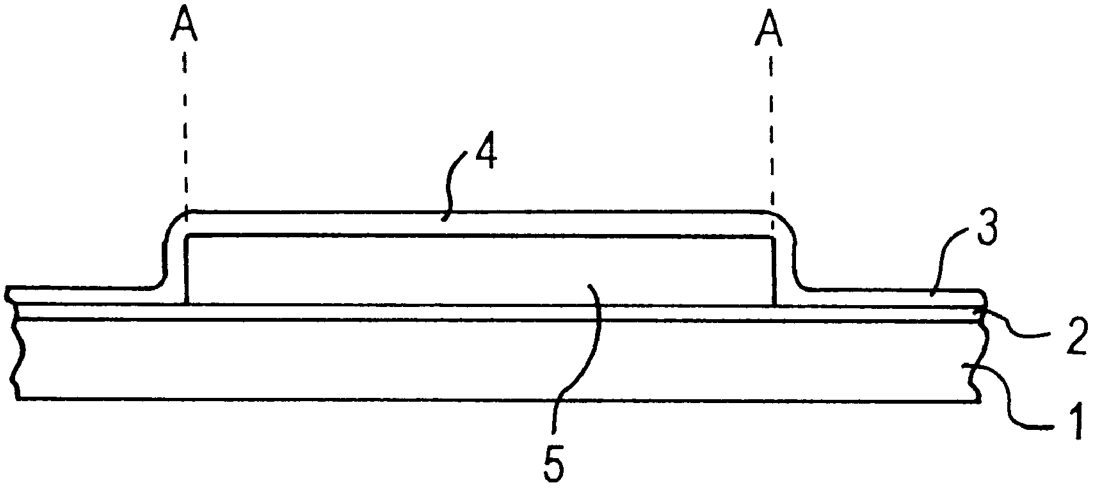

This invention relates to dry transfers having a pressure-sensitive adhesive layer on the indicia.

The need to have informative, decorative, or advertising matter on glass or other substrates has hitherto been solved by a variety of means originally by hand painting which is relatively crude and labour intensive, by using printed self adhesive materials which either have unsightly background or the obvious shape of the cut plastic or require tedious registration if punched to shape for example or by the use of pressure sensitive decals.

In the case of the latter the need to apply the adhesive in precise register with the graphics has always been a problem particularly where the graphics are extremely intricate. In the case of the most intricate small graphic elements there exists several problems with conventional self adhesive decals. With for example nitrocellulose inks used commonly for inks for such decals the strength of the ink is very limited and it is not possible to build sufficient strength in fine lines to enable the ink to be transferred easily without rupturing. If again the adhesive is printed overall and requires that the adhesive shears to enable the fine detail to be transferred without any unsightly traces of adhesive then the adhesive must be of very low tack enabling the shearing process to work. This in turn makes the receptivity to glass very poor and transfer of complex patterns very difficult indeed. The reason for the limitations found with screen process printed nitrocellular transfer is that the mesh required to print fine definition graphics is necessarily fine and the low solids content of nitrocellulose screen printing inks exacerbates the problem of getting sufficiently thick deposits of ink to give the strength required for ease of transfer and to overcome the cohesion of the adhesive coating so that the adhesive shears accurately. Increasing the tack of the adhesives to improve transfer increases the adhesive cohesion, thus preventing effective adhesive shearing. Also, increasing the subsequent adhesion of the graphics makes removal difficult. Altogether the limitations of conventional nitrocellulose decalcamania and transfers restrict the ease of use and the graphic qualities and make ease of removal also a problem. Such decals are describe din U.S. Pat. No. 5,571,557 for use as a simulated glass etch.

Among other solutions proposed for this problem are the methods disclosed in U.S. Pat. No. 4,820,559 in which a graphic design is printed and activated by solvent to make transfer of the design possible. In this particular example of the prior art, the difficulties of working with solvents to activate the transfer process, the time required to release solvents from between the carrier material and glass in order to develop bond of sufficient strength to overcome the bond between graphics and the carrier web, makes the process difficult, tedious and time consuming.

It is the object of the present invention to overcome the problems hitherto associated with means of decorating, marking, or providing advertising images by transfer onto a range of materials, including glass, plastics, metals, wood and painted surfaces.

According to one aspect of the present invention there is provided a decalcamania which comprises a heat-fused plastisol ink supported on a heat resistant carrier sheet and having an adhesive layer on the sheet, the adhesive being in contact with the plastisol ink and the ink consisting a plasticiser capable of migrating into the adhesive layer and interacting therewith to form a tacky adhesive layer in those parts of the plastisol ink in contact with the adhesive layer.

The invention also includes a method of preparing such transfers, said method comprising forming a design in a plastisol ink onto a heat-resistant flexible carrier sheet, curing the ink by heating and applying a pressure-sensitive adhesive layer over the design, said adhesive having a low intrinsic tack but being capable of interacting with plasticiser migrating from the cured plastisol ink to increase the level of tack in areas where the adhesive layer is in contact with the plastisol ink.

The steps involved in this new method involve the following:

A very strong and flexible ink is provided, which can be printed by screen process printing such that the ink is highly cohesive even when printed in fine lines. An ink which can provide these properties is described in GB Patent No. 1488487 and is a plastisol or organosol. In basic terms, the first advantages of a plastisol ink is that it contains little or no solvent so that the actual deposit printed is not significantly reduced in thickness on drying. This must be contrasted with nitrocellulose inks, for example, which normally will contain only 25–35% solids and therefore the deposit of ink possible for the same definition is only one third or one quarter of that obtainable by the plastisol ink. Hence the use of a plastisol ink provides a high solids ink (up to 100% solids) and this gives immediately three to four times the thickness of deposit compared to say nitrocellulose inks given the same screen mesh of equivalent definition. The additional strength of a plastisol ink compared to nitrocellulose inks is much higher and the elasticity considerably better. Combined with the fact that a fully cured plastisol can inherently be formulated to give many times more cohesive strength than a nitrocellulose ink the advantage of this type of ink is very evident. The plastisol inks are formulated from vinyl resins by mixing the vinyl resin powder with a suitable plasticiser. The choice of plasticiser is dependent on a number of factors, for example:

(a) some plasticisers dissolve the vinyl powders more readily than others and in some cases the plasticisers are such good solvents that some form of dissolution occurs even at room temperature. In such cases the inks are relatively unstable and after mixing, the solution of the vinyl polymer powder can cause the ink to increase in viscosity giving a relatively short pot life. When made and used in situ this is not necessarily a disadvantage if the process can be controlled in the production of the product. On the other hand some plasticisers do not dissolve the vinyl polymer powder so readily so that the pot life of the ink is better but higher temperatures are required for the plasticiser to dissolve the vinyl polymer and form the plastisol film. The plastisol inks employed in the present invention typically contain from 45 to 100 parts of plasticiser per 100 parts by weight of the vinyl polymer. Suitable plasticisers are alkyl phthalates, e.g. dialkyl phthalates wherein the alkyl group contains from 4 to 10 carbon atoms, e.g. dioctyl phthalate. Other types of pvc plasticisers may be employed such as tricresyl phosphate, or an alkyl sulfonic acid ester of phenol (available from Bayer under the trade mark Mesamoll). One may also use in conjunction with alkyl phthalates dibutyrate esters of polyhydric alcohols, e.g. 2,2,4-trimethyl-1,3-pentyl diisobutyrate, which is available from Eastman Chemicals under the trade name Eastman TXIB plasticiser. The vinyl polymer is preferably polyvinyl chloride but copolymers of vinyl chloride with other vinyl or vinylidene monomers can be employed. Normally, a dispersion of finely divided pvc particles is formed by mixing or milling the vinyl polymer particles into the plasticiser. The plastisol ink, which may be pigmented or clear, is deposited on the heat-resistant carrier sheet, preferably by a printing process. Screen painting is convenient because thick films can be readily formed. After forming the design on the carrier, the ink is cured by heat fusing to form a homogeneous plastisol layer. Typical curing conditions are 160 to 180° C. for 20 seconds to 5 minutes.

After curing the ink, a low tack pressure sensitive is deposited onto the cured design. The adhesive may be printed in register but this is unnecessary as will be explained below.

It is an observed fact that the plasticisers used to make the plastisol inks can be readily absorbed into pressure sensitive adhesives. This has been regarded in the past as a serious disadvantage, for example, in reducing the kinds of adhesives which may be selected for use in contact with highly plasticised pvc films, since the character of the adhesive is entirely changed as it picks up plasticiser from the pvc film. Consequently, adhesives of choice for application have been those unaffected by such migration, e.g. cross-linking, water-based acrylic adhesives.

The plasticiser migration from the vinyl plastisol to the adhesive can be accelerated if the adhesive contains solvents which are mutual solvents for the adhesive system and the plasticisers used. The temperature of processing is also a contributory factor. Under normal temperature conditions the migration of plasticiser from the plastisol to the adhesive reaches a stable balance after about three days of storage. The effect of the plasticiser on the adhesive is to reduce its cohesion and increase its tack. With a basically sticky adhesive used on a very compatible plasticised plastisol the result can be to turn the adhesive into a messy fluid.

It is, therefore, normal practice to formulate adhesives for plastisols or highly plasticised pvc films such that the plasticisers are, as far as possible, incompatible with the plasticisers used, water based adhesives are used in preference to solvent-based adhesives, and cross-linking polymers are preferred as adhesives to non-cross-linked, solvent-soluble adhesives.

However, the underlying concept of the present invention is to capitalise on those factors which have hitherto been regarded as major problems and to use the effects which can be so disadvantageous to very considerable benefit.

When formulating an adhesive for use in conjunction with a nitrocellulose ink the adhesive can be designed without reference to the formulation of the ink since no migration of materials occurs from the ink to the adhesive. This means that if the adhesive is coated outside the area coated by the ink the same physical characteristics of the adhesive are maintained. A tacky adhesive which might be required to give very good adhesion to say a glass surface would therefore be tacky not only over the ink area but also outside the area of the indicia. This is undesirable since a sheet say of a number of individual designs would grab the substrate and be very difficult to manipulate. Further, the adhesive would have a comparatively high cohesive nature and would be more difficult to shear around the perimeter of the ink.

However, with a plastisol ink which provides a migratable plasticiser, the adhesive can be so designed to accommodate the migration of adhesive to change the nature of the adhesive only in the area where the adhesive is in contact with the plastisol. In this case the adhesive is formulated such that outside the indicia area it is low tack and does not grab say a glass surface and can be readily moved and manipulated on the surface whilst on the indicia. Since the indicia is exactly in register with the adhesive surface, the latter will be effectively changed to give a more tacky adhesive which adheres well to the glass or other substrate. Furthermore the adhesive being intrinsically of low tack can be formulated to shear very easily.

The result effectively of combining the use of a low tack shearable adhesive with a plastisol such that the plastisol provides a migratable component or components which can suitably modify the tack and cohesion of the adhesive is that the product has a high tack only where it is required that is in complete registration with the indicia. By manipulating the types and quantities of various plasticisers having poor to good solvency for the vinyl polymer and poor to good migratory properties together with poor to good compatibility with the dry adhesive layer the proper degree of tack and cohesion can be imparted to the adhesive.

Since the migration of plasticisers into the adhesive takes a significant period of time (approx. 3 days) the exact properties of the stabilised product cannot be immediately determined. However, having established the formulations, bearing in mind the change occurring the final formulations take the changes into consideration.

Control over the level of adhesive tack by the manipulation of both ink formulation and adhesive formulations is broadly achieved as follows:

Adhesives which are based on vinyl polymers may be selected for the purposes of the invention, since the plasticisers employed in plastisols migrate effectively into vinyl polymer films. An adhesive coated layer consisting of, say, a polyvinyl isobutyl or butyl ether, will vary in tack and cohesiveness according to the average molecular weight of the layer.

Below 30,000 average mol wt the layer will be tacky and low in cohesion.

Between 30,000 and 70,000 average molecular weight the tack becomes less aggressive and the cohesion becomes much higher.

Over 70,000 average molecular weight the tack becomes much lower and the layer is extremely cohesive.

Without altering the cohesiveness of the adhesive the tack can be further altered by adding finely divided extenders such as silica or talc which reduce the intrinsic tack further.

The migratory plasticisers used in the plastisol will migrate relative to their molecular weight into the adhesive layer and thus reduce the average molecular weight of the adhesive layer.

The balance required is achieved by increasing the average molecular weight of the adhesive layer when the plastisol contains low molecular weight plasticisers and reducing the average molecular weight of the adhesive when the higher molecular weight plasticisers are used in the plastisol ink.

An average molecular weight of say 40,000 will give a very acceptable medium tack cohesive adhesive suitable for pressure-sensitive dry transfers. A level of tack similar to that exhibited by such an adhesive would be achieved in accordance with this invention by selecting one or more polyvinyl isobutyl ethers of average molecular weight above 60,000, and using low molecular weight plasticisers in the plastisol ink which will migrate into the adhesive to give in the final decalcamania an adhesive having an average mol weight of about 40,000.

A wax may be included in the adhesive formulations to modify the tack level of the adhesive.

Plastisol inks require to be cured at temperatures between 120–180° C., preferably 140 to 180° C., for between 20 seconds and 5 minutes, preferably from 30 seconds to 1 minute. Because of this high temperature requirement it is necessary to use temporary supports which withstand this kind of temperature. Whilst it may be possible to use supports like paper or "Teflon"-coated fabric etc. it is most practical to use polyester film.

The polyester film used would normally be between 50 and 100 microns thick to allow for ease of use during sheet fed printing operations but could be thinner, e.g. 20 to 40 or 50 microns, for reeled printing operations.

The ease of release of plastisol inks from polyester films varies depending on the characteristics of the ink and the surface of the polyester. In order to improve the release qualities of the inks the polyester film can be coated with a release agent.

It is possible to use modified silicone release agents for this purpose, but normally this is not always satisfactory since the print qualities are affected and the release of adhesive outside the indicia area is also possible. A more acceptable release coating can be produced using "Quillon" (a product of DuPont Corp.). Even this is usually too good a release coating and gives rise to problems through poor adhesion of the adhesive coating. Much more superior results are obtained by using release coatings based on cross linked epoxy polyamides or similar highly cross-linked enamel type resins such as urea or melamine formaldehyde resins. Other very satisfactory release coatings can be made from water soluble resins such as polymethyl vinyl ether/maleic anhydride resins and cellulose derivatives.

The release coating is applied to the heat-resistant flexible film using very dilute solutions of the resins to give coating weights of 0.1–2 microns. Whilst curing the polyester may mean heating the sheets or reels to temperatures in excess of 140° C., this process can be beneficially used to heat shrink the polyester to maintain more precise dimensional stability at the printing stage should this be required.

Instead of printing the adhesive over the plastisol ink design; the sequence may be reversed and an adhesive layer printed first, followed by the plastisol ink. In such an embodiment, a flexible, heat-resistant carrier sheet is coated with a release agent, e.g. the carrier sheet is a silicone treated paper. The carrier sheet, which may be in the form of a web or continuous strip, is printed overall with a low tack adhesive and dried. Indicia in a plastisol ink are then printed onto the dried adhesive layer and cured by heat fusing the plastisol. The resulting web can be coiled immediately without an intervening release sheet because neither the adhesive nor the surfaces of the indicia have any significant tack. After storage for about 2–3 days, the adhesive under the indicia will have increased in tack level because of migration of plasticiser into the portion of the adhesive coating which is sandwiched between the indicium and the siliconised paper. The indicia can then be transferred to a receptor surface, e.g. by pulling the web around an edge or corner. Because of the thickness and stiffness of the indicia, this will cause them to lift from the carrier paper, when their tacky under-surface is exposed and can be pressed onto a receptor surface. Because the adhesive outside the areas covered by the indicia has a low tack, and is relatively thin, it remains adhered to the siliconised paper surface. This embodiment is particularly suitable for printing labels.

The invention is illustrated in FIG. 1 of the accompanying drawings which is a section through a dry transfer in accordance with the invention.

Referring to the drawing, a flexible carrier sheet 1 of heat resistant polymer film is preferably transparent or translucent and is coated with an adherent thin release layer 2. On the surface of the release layer one or more indicium or other design 5 is printed in a heat-fused plastisol ink. Coated over the indicium 5 and extending over the surface of the release layer is a coating of a pressure sensitive adhesive 3. This adhesive has an intrinsically low tack so that it forms a bond of low strength with a substrate. The adhesive is susceptible to plasticiser migration from the plastisol ink 5 so that, after several days storage following manufacture, the portion 4 of adhesive develops increased tack. When the surface of the portion 4 of adhesive is pressed into contact with a receptor surface, a strong bond is developed which, on manipulating the carrier sheet 1, causes the adhesive to shear around the periphery of the indicium. Thus, the indicium 5 is lifted from the carrier sheet leaving the remaining adhesive 3 attached to the carrier sheet.

EXAMPLES

EXAMPLE 1

1. Polyester film 75 microns thick (e.g. Melinex film)

The film was coated with a release coating of poly methyl vinyl ether/maleic anhydride and cured at 160° C. on a conveyorised belt.

Indicia were printed on the release coating of a film thickness of about 20 microns using a black vinyl plastisol ink having the following formula and cured by heating to a temperature of about 180° C. in a tunnel oven for 60 seconds:

| | |
|---|---|
| Vinyl chloride homopolymer | 62.65 |
| Dioctyl phthalate (plasticiser) | 22.50 |
| Tin based stabiliser | 2.00 |
| Carbon black | 2.65 |
| Ezsol D40 (aliphatic hydrocarbon solvent) | 9.70 |

The indicia were letters and numerals suitable for vehicle licence plates.

An adhesive was prepared having the following formulation:

| | |
|---|---|
| Polyvinyl isobutyl ether average mol wt 100,000 | 3.00 |
| Polyvinyl isobutyl ether average mol wt 60,000 | 12.00 |
| Hydrogenated ester resin (tackifier) | 8.0 |
| Finely divided Silica | 2.4 |
| Ethylene glycol mono ethyl ether | 12.00 |
| Xylene | 20.00 |
| White Spirit | 42.6 |

The above adhesive was coated over the entire printed sheet by screen-printing and then oven dried at about 100° C.

The adhesive after drying had a very low tack but the tack developed after three days in the precise region of the indicia to give a highly tacky and cohesive film over the plastisol indicia and a low tack in the areas outside the indicia.

The indicia were protected with a silicone coated protective paper for storage prior to use. The indicia could be transferred to a glass sheet, the indicia adhering strongly to the sheet and the adhesive shearing precisely around the periphery of the indicia so that there was no border of transferred adhesive around the periphery of the transferred indicia.

EXAMPLE 2

A carrier sheet consisting of 75 micron polyester was coated with polyvinyl vinyl ether/maleic anhydride solution and heated to 150–180° C. to form a release layer on the carrier sheet.

The coated sheet was printed with graphics using heat set inks by the offset litho process.

A clear plastisol layer was screen printed in register with the offset litho print using the plastisol ink described in Example 1, except that the carbon black pigment was ommitted and heat-fused as described in Example 1.

A pressure sensitive adhesive of non-cross-linking acrylic type was printed over the entire sheet covering the printed graphics. After 3 days storage, the adhesive developed a differential tack, being of high tack in the area of the printed graphics but of low tack outside. The adhesive surface was protected with siliconised paper during storage.

EXAMPLE 3

A polyester sheet of 75 micron thickness was given an epoxy polyamide release coating having a dry film thickness of approximately 0.5 micron.

A design in a clear plastisol ink containing mica and silica extender was printed on the release coating to give an etched glass appearance. The plastisol ink was cured as described in Example 1.

An adhesive as described in Example 1 was applied over the sheet so that it covered the design. A differential adhesive tack was developed with the adhesive on the plastisol ink exhibiting a high surface tack and the surrounding adhesive having a very low surface tack. The resulting decalcamania could be used to transfer lettering or other design to a window, and simulated the appearance of an etched glass design. The adhesive sheared precisely around the design and no adhesive transferred with the design.

Other variations may be made in the preparation of transfers in accordance with the invention. For example, other release coatings may be used such as melamine-formaldehyde coatings. A variety of effects may be achieved, e.g. by screen printing normal vinyl or other inks over the plastisol ink. Interesting effects may be secured where the plastisol ink is formulated to give an etched glass appearance (as in Example 30 or is a white pigmented plastisol ink and additional designs are overprinted. Tinted clear plastisol inks may also be employed.

Any of the conventional printing methods can be used to apply the plastisol or other inks, including using digital laser printers.

There are many uses for the transfers of this invention, including for application to glass as a resist for sand-blasting and for manufacture of number plates.

What is claimed is:

1. A decalcamania which comprises a heat-fused plastisol ink supported on a heat resistant carrier sheet and having an adhesive layer on the sheet, the adhesive being in contact with the plastisol ink and the ink containing a plasticiser capable of migrating into the adhesive layer and interacting therewith to form a tacky adhesive layer in those parts of the plastisol ink in contact with the adhesive layer.

2. A decalcamania as claimed in claim 1 wherein the plastisol ink is printed on said carrier sheet and forms indicia thereon.

3. A decalcamania as claimed in claim 1 wherein the carrier sheet has a release layer, the plastisol ink being supported on the release layer.

4. A decalcamania as claimed in claim 1 wherein the plastisol ink is pigmental.

5. A decalcamania as claimed in claim 1 wherein indicia, which are formed in a non-plastisol ink, are supported on said carrier sheet and said indicia carry an adhesive layer, the adhesive layer extending over the plastisol ink layer.

6. A decalcamania as claimed in claim 5 wherein the adhesive layer is printed in register with said indicia.

7. A decalcamania as claimed in claim 5 wherein the plastisol ink layer is a clear plastisol ink layer.

8. A decalcamania as claimed in claim 5 wherein the adhesive comprises a polyvinyl isobutyl ether.

9. A decalcamania as claimed in claim 8 in which the adhesive contains a solvent which is a solvent for the plasticiser in the plastisol ink.

10. A decalcamania as claimed in claim 1 wherein a low tack adhesive forms a layer on the carrier sheet and the plastisol ink is printed onto the adhesive layer so that adhesive between the ink and the carrier sheet is rendered tacky by migration of plasticiser from the plastisol layer.

11. A decalcamania as claimed in claim 10 wherein the carrier sheet is a web whose surface has been treated or coated with a release agent and indicia in a plastisol ink are printed onto said surface.

12. A method of manufacturing a dry transfer which comprises forming a design in a plastisol ink onto a heat-resistant flexible carrier sheet, curing the ink by heating and applying a pressure-sensitive adhesive layer over the design, said adhesive having a low intrinsic tack but being capable of interacting with plasticiser migrating from the cured plastisol ink to increase the level of tack in areas where the adhesive layer is in contact with the plastisol ink.

* * * * *